United States Patent
Reimann

[15] 3,704,947
[45] Dec. 5, 1972

[54] MICRO-FILM CAMERA

[72] Inventor: Hubertus Reimann, Dresden, Germany

[73] Assignee: VEB Pentacon Dresden Kamera-und Kinowierke, Dresden, Germany

[22] Filed: Jan. 4, 1971

[21] Appl. No.: 103,672

[52] U.S. Cl. .......................355/68, 355/69, 250/236
[51] Int. Cl. ...............................................G03b 27/78
[58] Field of Search ............355/68, 69, 71; 250/236; 356/203

[56] References Cited

UNITED STATES PATENTS

| | | | |
|---|---|---|---|
| 2,749,799 | 6/1956 | Strem | 355/68 |
| 3,096,176 | 7/1963 | Craig | 355/68 X |
| 3,205,767 | 9/1965 | Weber et al. | 355/71 X |
| 3,575,702 | 4/1971 | Huber | 355/68 X |

*Primary Examiner*—Samuel S. Matthews
*Assistant Examiner*—Michael L. Gellner
*Attorney*—Young & Thompson

[57] ABSTRACT

A microfilm camera for reproducing documents is provided with a photo receiver mounted on its housing. An optical system mounted on the housing directs light reflected by a punctiform area near the edge of the document to be photographed onto the photo receiver. A wedge prism is rotatably mounted on the housing in the light path between the photo receiver and the document to enable the puntiform portion scanned by the photo-receiver to be varied over the document and its border during a rotation of the wedge prism. Mounted on the housing is a drive means which rotates the wedge at a constant speed. Provision is made for reducing the output from the photo-electric device to a zero illumination level once during each revolution of the wedge prism. Mounted on the housing is a measuring circuit which includes a rectifier connected with an output of the photo-receiver and a storage device having a time constant long compared with the time for one rotation of the wedge prism and effective to store a voltage indicative of the brightness of the document. A control device is influenced by the output of the storage device provides a controlled voltage which influences the illumination of the lamp in dependence on the brightness of the document border.

4 Claims, 3 Drawing Figures

MICRO-FILM CAMERA

BACKGROUND TO THE INVENTION

The invention relates to a micro-film camera for reproducing documents, which has an automatic exposure-control device, wherein the maximum intensity value, reflected by the subject base and received by the photoelectric cell is taken into account and used for exposure control.

In known apparatuses of this kind, the photo-electric receivers, which punctiformly scan the subject base, are rigidly arranged above the plane of the subject. In the operation of such an apparatus attention must be given that at least during the measuring operation, which takes place before the photographic taking of the subject, an uninscribed part of the subject is scanned by a photo-electric receiver. This applies especially in the case of continuous cameras and cameras for immobile subjects which are intended for different subject formats. In the case of continuous cameras the edge of the subject departs from the measurement point, while in the case of different subject formats the marginal zones of the different subject formats likewise are not always to be expected in the same position. Thus the necessity arises of storing the measurement result and using it as constant control value during the entire exposure operation. Fluctuations of intensity of illumination during the exposure operation cannot be taken into consideration and lead to different negative density qualities, which makes the procedure of re-enlargement more difficult.

The invention has the aim of better assurance of a constant quality of the photographic exposure, and has the object of directly compensating any fluctuations of intensity of illumination which occur during the exposure operation.

SUMMARY OF INVENTION

According to the invention this is achieved in a microfilm camera for reproducing documents with the provision of a photo-receiver mounted on the camera housing, an optical system mounted on the camera housing for directing light reflected by a punctiform area near to the edge of the document to be photographed onto the photoreceiver, a wedge prism rotatably mounted on the housing in the light path between the photo receiver and the document to enable different punctiform portions of the document and its border to be scanned by the photo receiver during a rotation of the wedge prism, drive means mounted on the housing for rotating the wedge at constant speed, means for reducing the output of the photo-electric device to a zero illumination level once during each revolution of the wedge prism, a measuring circuit mounted on the housing including a rectifier circuit connected with an output of the photo receiver and a storage device having a time constant long compared with the time for one rotation of the wedge prism effective to store a voltage indicative of the brightness of the document, a control device having an input connected with the output of the storage device and an output connected with a lamp arranged to illuminate the document whereby the illumination of the document is controlled by the control device in dependence on the brightness of the document border.

BRIEF DESCRIPTION OF DRAWINGS

The invention will now be described by way of example with reference to the accompanying drawings in which.

DESCRIPTION OF PREFERRED EMBODIMENT

Figure 1:
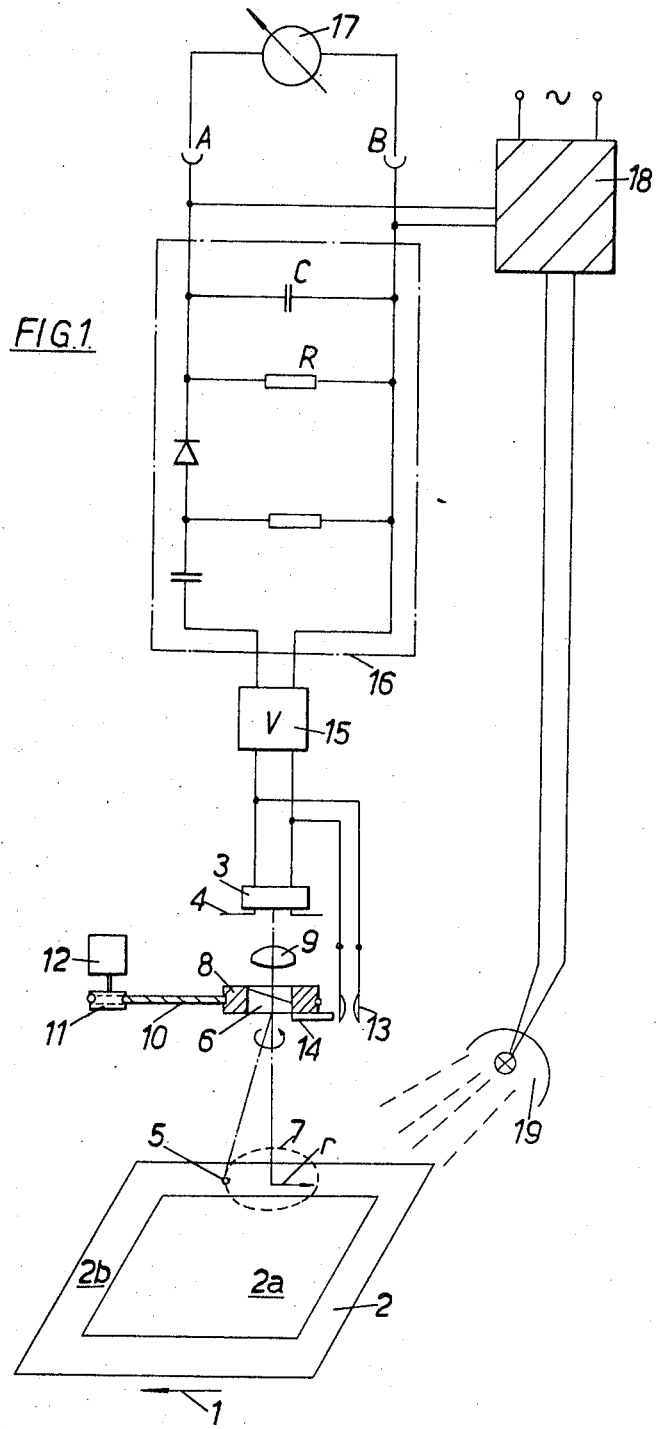
FIG. 1 shows a diagrammatic overall construction of a microfilm camera.

A subject 2, which may be a document to be reproduced on a film in known manner by a picture-taking optical system (not shown), is situated on a subject carrier (not shown) which is non-displaceably arranged or movable in the direction of the arrow 1. An inscription image is situated in the middle area 2a of the document 2, while a margin 2b is uninscribed. Therefore on illumination of the subject the light intensity corresponding to the reflection of the base material is reflected by the marginal zone 2b.

A photo-receiver 3 is arranged above the subject 2 (see FIG. 1). Beneath a photo-receiver 3 there is situated the diaphragm 4, which permits adjustment of the light transmitted to the reception surface of the photo-receiver 3, so that constant exposure factors, for example the film sensitivity or filter values, can be introduced. The optical system 9 directs light from the document onto the photo receiver which receiver has only a small surface area sensitive to light so that for example a punctiform measurement point 5 in the marginal zone 2b influences the receiver. An optical deflection system in the form of a glass wedge 6 is provided in front of the optical system 9 which wedge refracts the light passing through to the photo receiver so that by rotation of the wedge the measurement point 5 revolves and the portion scanned by the photo receiver follows a path 7. The The radius r of the measurement path 7 is dimensioned according to the displacement of the marginal zones to be expected in the case of different subject formats. The glass wedge 6 is embedded in a mounting 8, which is coupled through a cord 10 with a drive wheel 11 of a motor 12.

Parallel with the photo-receiver 3 a short-circuit switch 13 is provided. On the mounting 8 a switch cam 14 is arranged which operates the switch 13 which short-circuits the photo-receiver 3 during a part of the rotation of the glass wedge 6. Thus a value "zero" can be imitated as a basic light intensity value.

Figure 2:
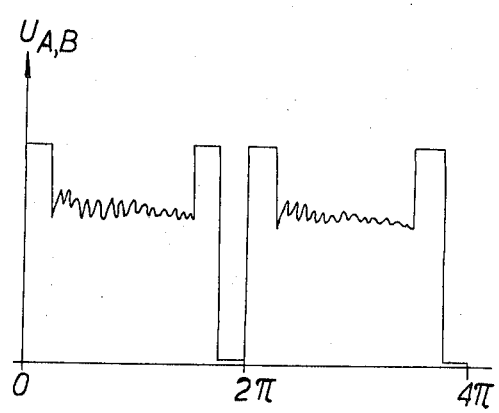
FIG. 2 shows an output voltage waveform for the photo receiver shown in FIG. 1
Figure 3:
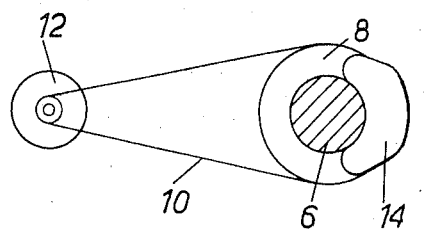
FIG. 3 shows a view of a cam driving arrangement for operating a switch

At every revolution of the glass wedge 6 at least one voltage pulse occurs at the output of the photo-conductive cell, which pulse corresponds to the light reflected by the base material of the subject, and at least one further voltage pulse occurs there which corresponds to the light reflection value "zero" of a black subject. A voltage waveform emitted by the photo-receiver in the case of the example of embodiment illustrated in FIG. 1 is represented in FIG. 2.

The output of the photo-receiver 3 is connected to an alternating-current amplifier 15, to the output of which a peak-value rectifier circuit 16 is connected. Assuming that the time constant RC is made large in relation to the period of a complete rotation of the glass wedge 6, a voltage $U_{AB}$ occurs between the terminals A and B which is proportional to the difference between the reflection capacity of the subject base and the "zero" value, that is it constitutes a direct measure of the correct exposure of the subject. After the measuring arrangement has once been calibrated, a deflection of the pointer of the measuring instrument 17 is obtained as value for the correct exposure.

For the automation of the exposure adjustment as electronic control apparatus 18, automatically influences current supplied to an illuminating device and is connected in parallel with the terminals A and B. This control apparatus 18 in known manner contains two triggers with constant but different threshold voltages and without great hysteresis. Each trigger is operative to actuate a respective relay, which relays influence the direction of rotation of a motor. In the case of correct illumination both relays are at rest. The motor in a known manner adjusts a regulating transformer to provide a variable voltage which influences the intensity of the lamps 19. In the case of insufficient illumination of the subject, indicated by inadequate output voltage between the terminals A and B, one relay is operated by its respective trigger and causes the motor to run in the direction of rotation that a transformer voltage output increases and the lamps 19 light more brightly. This motor rotation lasts until the voltage between the terminals A and B has reached a value which causes The trigger to de-energizes the relay. In the case of over-illumination the motor rotates in the opposite direction, the rotation being instigated and terminated by the other trigger and respective relay. The control apparatus 18 may include a regulating circuit in which lamp brightness is controlled by means of thyristors. In this case the voltage present between the terminals A and B is effective to control the ignition angle of the thyristors.

The generation of the basic intensity value may be effected by alternating means. By way of example a rotating blade-type diaphragm e.g. a sector diaphragm which may be geared with the rotating glass wedge 6 to periodically interrupt the ray path to the photo-receiver 3, preferably with a frequency higher than the frequency of rotation of the rotating glass wedge 6. It is also possible for the area situated outside the subjects, that is the surface of the subject carrier, to be kept as dark as possible, so that a basic intensity value is achieved during every scanning period according to a low reflection characteristic of the subject carrier. It is also possible to permit the measurement point 5 to run on the measurement path 7 lying outside the subject over an auxiliary light source of constant luminous intensity, which is less than the minimum reflection of the subject base ever occurring. The deflection optical system can also be formed by a swinging mirror.

I claim:

1. In a microfilm camera for reproducing documents the provision or a photo-receiver mounted on the camera housing, an optical system mounted on the camera housing for directing light reflected by a punctiform area near to the edge of the document to be photographed onto the photo-receiver, a wedge prism rotatably mounted on the housing in the light path between the photo-receiver and the document to enable different punctiform portions of the document and its border to be scanned by the photo-receiver during a rotation of the wedge prism, drive means mounted on the housing for rotating the wedge at constant speed, means for reducing the output of the photo-electric device to a zero illumination level once during each revolution of the wedge prism, a measuring circuit mounted on the camera housing including a rectifier circuit connected with an output of the photo-receiver and a storage device having a time constant long compared with the time for one rotation of the wedge prism effective to store a voltage indicative of the brightness of the document, a control device having an input connected with the output of the storage device and an output connected with a lamp arranged to illuminate the document whereby the illumination of the document in controlled by the control device in dependence on the brightness of the document border.

2. A microfilm camera according to claim 1 wherein the means for reducing the output of the photo-electric device to zero illumination level comprises a switch adapted to short circuit the photo-electric device and a switch cam mounted on the housing and driven by the drive means to effect closure of the switch.

3. A microfilm camera according to claim 1 wherein the reduction of the output of the photo-electric device to zero illumination level is effected by the wedge prism which is adapted so that the variable portion scanned overlaps the edge of the document whereby no reflection occurs.

4. In a microfilm camera for reproducing documents of the type having a sector diaphragm driven by a drive means and effective to block light passage to a photo-receiver during each exposure, the provision of an optical system mounted on the camera housing for directing light reflected by a punctiform area near to the edge of the document to be photographed onto the photo-receiver, a wedge prism rotatably mounted on the housing and coupled to the drive means, which prism is positioned in the light path between the photo-receiver and the document to enable different punctiform portions of the document and its border to be scanned by the photo-receiver during a rotation of the wedge prism by the drive means, a measuring circuit mounted on the camera housing including a rectifier circuit connected with an output of the photo-receiver and a storage device having a time constant long compared with the time for one rotation of the wedge prism effective to store a voltage indicative of the brightness of the document, a control device having an input connected with the output of the storage device and an output connected with a lamp arranged to illuminate the document whereby the illumination of the document is controlled by the control device in dependence on the brightness of the document border.

* * * * *